(12) United States Patent
Partridge et al.

(10) Patent No.: US 9,104,024 B2
(45) Date of Patent: Aug. 11, 2015

(54) HEADS-UP DISPLAY WITH AN ACHROMATIC LENS FOR USE IN UNDERWATER APPLICATIONS

(71) Applicant: Shearwater Research Inc., Vancouver (CA)

(72) Inventors: Bruce Gregory Partridge, Vancouver (CA); Tyler Coen, Burnaby (CA); Kevin John Zulonas, Vancouver (CA); Mitchell Gordon Burton, Coquitlam (CA)

( * ) Notice: Subject to any disclaimer, the term of this patent is extended or adjusted under 35 U.S.C. 154(b) by 6 days.

(21) Appl. No.: 14/065,418

(22) Filed: Oct. 29, 2013

(65) Prior Publication Data
US 2014/0049832 A1 Feb. 20, 2014

(51) Int. Cl.
G02B 27/14 (2006.01)
G02B 27/01 (2006.01)

(52) U.S. Cl.
CPC .................................. *G02B 27/017* (2013.01)

(58) Field of Classification Search
CPC ............. G02B 27/017; G02B 27/0172; G02B 27/0176; G02B 27/0179
USPC .......... 359/630, 629, 618; 340/815.47; 345/7, 345/8, 9; 348/115; 349/11; 353/119
See application file for complete search history.

(56) References Cited

U.S. PATENT DOCUMENTS

| | | | |
|---|---|---|---|
| 5,539,422 A | 7/1996 | Heacock et al. | |
| 5,886,822 A | 3/1999 | Spitzer | |
| 6,181,644 B1 | 1/2001 | Gallagher | |
| 6,204,975 B1 | 3/2001 | Watters et al. | |
| 6,868,360 B1 | 3/2005 | Olstad et al. | |
| 7,038,639 B1 | 5/2006 | Olstad et al. | |
| 7,639,208 B1 * | 12/2009 | Ha et al. ............................ | 345/8 |
| 8,159,751 B2 * | 4/2012 | Martins ......................... | 359/630 |
| 2008/0106489 A1 | 5/2008 | Brown et al. | |
| 2009/0161225 A1 | 6/2009 | Liu | |
| 2010/0254017 A1 | 10/2010 | Martins | |
| 2012/0235902 A1 | 9/2012 | Eisenhardt et al. | |
| 2013/0044043 A1 | 2/2013 | Abdollahi et al. | |
| 2013/0222213 A1 | 8/2013 | Abdollahi et al. | |
| 2013/0222235 A1 | 8/2013 | Abdollahi et al. | |

FOREIGN PATENT DOCUMENTS

| | | |
|---|---|---|
| WO | 2010076177 | 7/2010 |
| WO | 2012035021 | 3/2012 |

OTHER PUBLICATIONS

English Abstract of WO 2012035021 which was published on Mar. 22, 2012 as made available from esp@cenet as of Nov. 6, 2014.
English Abstract of WO 2010076177 which was published on Jul. 8, 2010 as made available from esp@cenet as of Nov. 6, 2014.

* cited by examiner

*Primary Examiner* — Tuyen Tra
(74) *Attorney, Agent, or Firm* — Cameron IP

(57) ABSTRACT

A heads-up display comprises a housing. A display panel is disposed within the housing. An objective lens is disposed within the housing. An achromatic lens is disposed within the housing between the display panel and the objective lens.

4 Claims, 3 Drawing Sheets

HEADS-UP DISPLAY WITH AN ACHROMATIC LENS FOR USE IN UNDERWATER APPLICATIONS

BACKGROUND OF THE INVENTION

1. Field of the Invention

The present invention relates to a heads-up display and, in particular, to a heads-up display with an achromatic lens for use in underwater applications.

2. Description of the Related Art

It is known to mount a heads-up display on headgear. For example, U.S. Pat. No. 6,868,360 which issued on Mar. 15, 2005 to Olstad et al., discloses a heads-up display with a waterproof housing having a mounting mechanism which engages a part of a headgear worn by a user to position the heads-up display in a portion of a forward field of view of the user. A magnetic field sensor module is disposed within the housing and provides magnetic field data signals. An optical element having a wide field of view transmits data images representative of the magnetic field data signals to eyes of the user. Compass data may thereby be viewed by the user in low visibility conditions.

SUMMARY OF THE INVENTION

It is an object of the present invention to provide an improved heads-up display.

There is accordingly provided a heads-up display comprising a housing. A display panel is disposed within the housing. An objective lens is disposed within the housing. An achromatic lens is disposed within the housing between the display panel and the objective lens. Information on the display panel is visible by a user looking through the objective lens and the achromatic lens. The heads-up display is coupled to a rebreather by a mounting arm. The mounting arm may be an articulated mounting arm.

The improved heads-up display disclosed herein may be used to effectively display information with limited chromatic and spherical aberration.

BRIEF DESCRIPTIONS OF DRAWINGS

The invention will be more readily understood from the following description of the embodiments thereof given, by way of example only, with reference to the accompanying drawings, in which.

DESCRIPTIONS OF THE PREFERRED EMBODIMENTS

Figure 1:
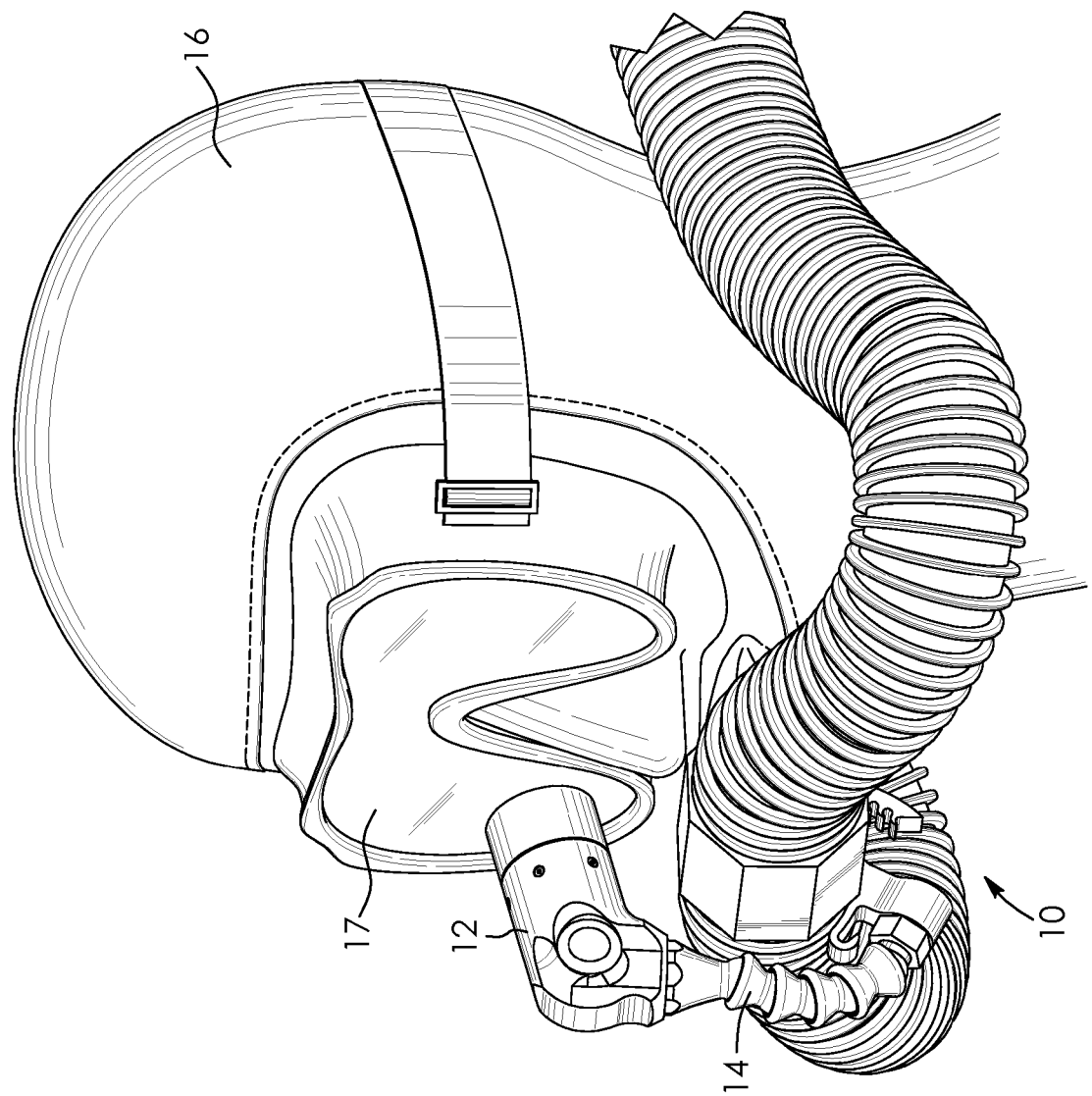
FIG. 1 is a perspective view of a heads-up display mounted on a rebreather and a head of a user.

Referring to the drawings and first to FIG. 1, a rebreather 10 is shown in fragment. The rebreather 10 is a conventional rebreather commonly used by divers and is accordingly not described in detail herein. There is an improved heads-up display 12 coupled to the rebreather 10 by a mounting arm 14. The mounting arm 14 is an articulated arm in this example which allows a user 16 to adjust a position of the heads-up display 12 in order to place the heads-up display 12 in a line of sight of the user 16 through goggles 17. In this example, the mounting arm 14 is press-fitted to the heads-up display 12.

Figure 2:
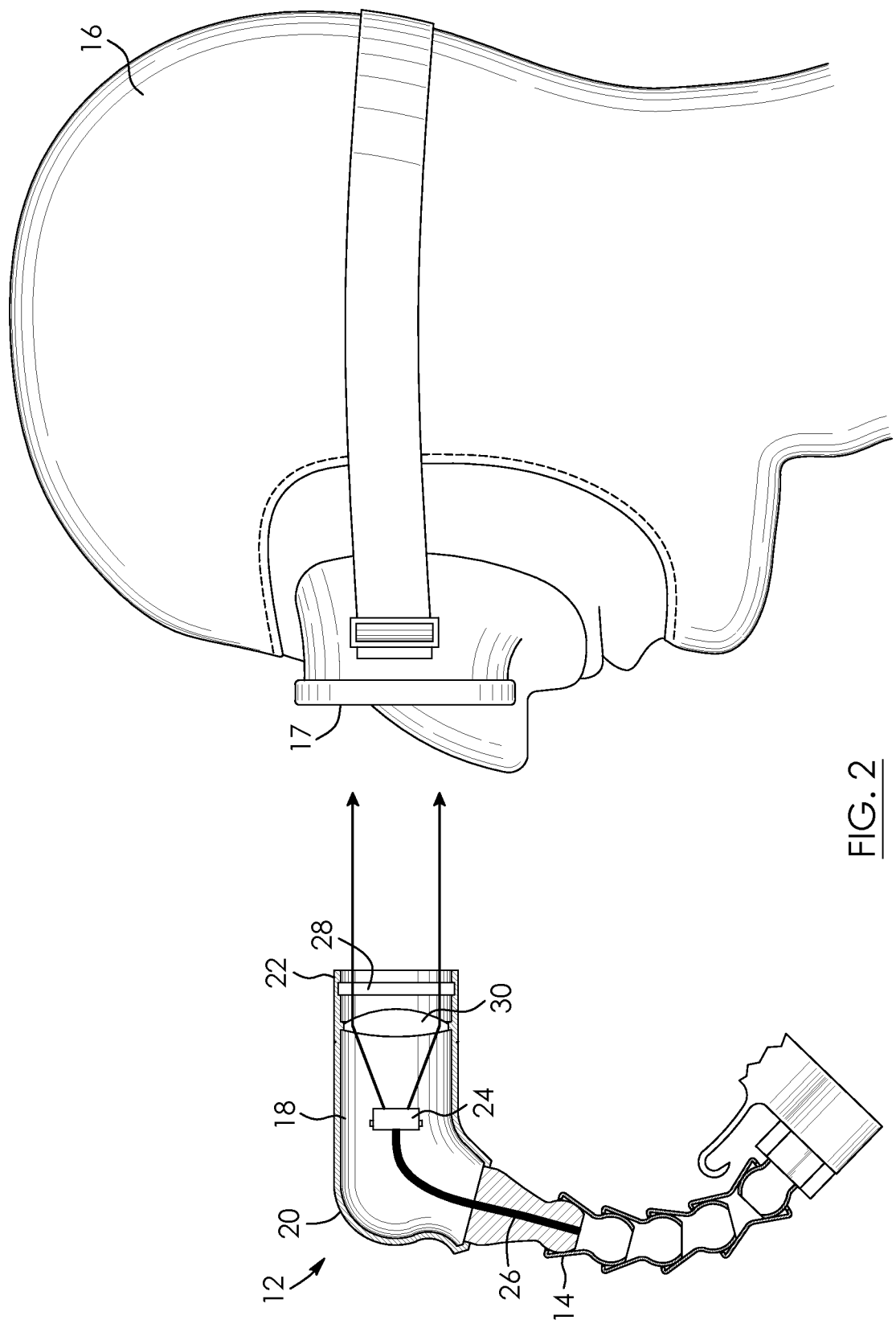
FIG. 2 is a cross-section view of the heads-up display of FIG. 1 and the head of the diver.
Figure 3:
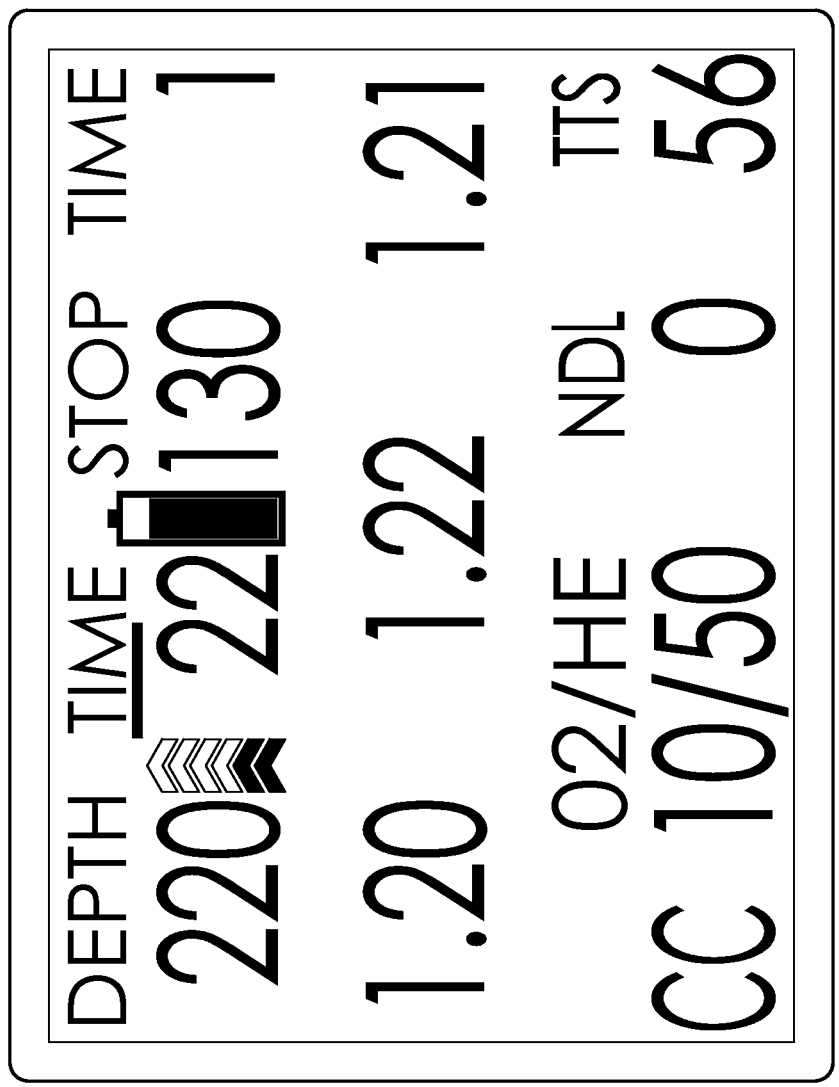
FIG. 3 is an elevation view of a display panel of the heads-up display of FIG. 1.

The heads-up display 12 is best shown in FIG. 2 and is substantially cylindrical and elongate in this example but may be any shape. The heads-up display 12 comprises a housing 18 having a proximal end 20 and a distal end 22 relative to the rebreather 10. The proximal end 20 of the housing 18 is connected to the mounting arm 14 and the distal end 22 of the housing 18 faces the user 16. There is a display panel 24 disposed within the housing 18. The display panel 24, shown in greater detail in FIG. 3, is a conventional display panel used in heads-up displays and is accordingly not described in detail herein. In this example, the display panel 24 is an LED display panel but may be any type of display panel. Referring back to FIG. 2, in this example, the display panel 24 is connected to a dive computer (not shown) by a cable 26 which allows communication between the heads-up display 12 and the dive computer. However, in other examples, the heads-up display 12 may be in wireless communication with the dive computer.

There is an objective lens 28 disposed within the housing 18 towards the distal end 22 thereof and an achromatic lens 30 disposed within the housing 18 between the display panel 24 and the objective lens 28. Information on the display panel 24 is visible by the user 16 looking through the objective lens 28 and the achromatic lens 30.

It will be understood by a person skilled in the art that many of the details provided above are by way of example only, and are not intended to limit the scope of the invention which is to be determined with reference to the following claims.

What is claimed is:

1. A heads-up display comprising:
   a housing;
   a display panel disposed within the housing;
   an objective lens disposed within the housing; and
   an achromatic lens disposed within the housing between the display panel and the objective lens;
   wherein the heads-up display is coupled to a rebreather by a mounting arm.

2. The heads-up display as claimed in claim 1 wherein information on the display panel is visible by a user looking through the objective lens and the achromatic lens.

3. The heads-up display as claimed in claim 1 wherein the mounting arm is an articulated mounting arm.

4. A heads-up display comprising:
   a housing;
   a display panel disposed within the housing;
   an objective lens disposed within the housing; and
   an achromatic lens disposed within the housing between the display panel and the objective lens;
   wherein the heads-up display is coupled to a rebreather.

* * * * *